United States Patent
Alameh et al.

(10) Patent No.: US 9,864,039 B2
(45) Date of Patent: Jan. 9, 2018

(54) PORTABLE ELECTRONIC DEVICE PROXIMITY SENSORS WITH MULTI-DIRECTIONAL FUNCTIONALITY

(71) Applicant: Motorola Mobility LLC, Chicago, IL (US)

(72) Inventors: Rachid M Alameh, Crystal Lake, IL (US); Patrick J Cauwels, South Beloit, IL (US); Paul Steuer, Hawthorn Woods, IL (US)

(73) Assignee: Motorola Mobility LLC, Chicago, IL (US)

( * ) Notice: Subject to any disclaimer, the term of this patent is extended or adjusted under 35 U.S.C. 154(b) by 221 days.

(21) Appl. No.: 14/751,325

(22) Filed: Jun. 26, 2015

(65) Prior Publication Data

US 2016/0377696 A1    Dec. 29, 2016

(51) Int. Cl.
*G01S 3/783* (2006.01)

(52) U.S. Cl.
CPC .................. *G01S 3/783* (2013.01)

(58) Field of Classification Search
CPC ... H04M 2250/12; G01J 1/4228; G06F 3/017; G01S 3/783
USPC ................. 250/338.1, DIG. 1, 342
See application file for complete search history.

(56) References Cited

U.S. PATENT DOCUMENTS

| | | | | |
|---|---|---|---|---|
| 3,614,919 A * | 10/1971 | Douglas | ................. | G03B 7/085 396/454 |
| 4,677,652 A * | 6/1987 | Duinker | ................. | A61B 6/06 378/145 |
| 4,698,511 A * | 10/1987 | Sueda | ................. | G01B 11/02 250/559.19 |
| 4,782,327 A * | 11/1988 | Kley | ................. | G05G 9/047 250/221 |
| 5,834,765 A * | 11/1998 | Ashdown | ................. | G01J 1/04 250/214 AL |
| 5,929,445 A * | 7/1999 | Barone | ................. | G08B 13/193 250/353 |
| 6,127,926 A * | 10/2000 | Dando | ................. | G08B 13/2491 340/522 |
| 6,639,696 B1 * | 10/2003 | Nishio | ................. | H04N 1/02409 358/475 |
| 6,917,025 B1 * | 7/2005 | Diehl | ................. | B64G 1/361 244/164 |
| 7,921,480 B2 * | 4/2011 | Parsons | ................. | E03C 1/05 137/624.11 |
| 9,465,448 B2 * | 10/2016 | Idzik | ................. | G06F 3/0304 |

(Continued)

*Primary Examiner* — David Porta
*Assistant Examiner* — Blake Riddick
(74) *Attorney, Agent, or Firm* — Philip H. Burrus, IV

(57) ABSTRACT

An electronic device includes a housing, one or more processors, and one or more proximity sensor components, each having an infrared signal receiver to receive an infrared emission from an object external to the housing. The proximity sensor component is disposed by a first aperture and a second aperture, the first aperture having a first axis oriented in a first direction and the second aperture having a second axis oriented in a second direction. Attenuation of infrared emissions can occur through one of the first aperture or the second aperture. The one or more processors can determine whether a received infrared emission is attenuated to detect whether the received infrared emission was received from the first direction or the second direction.

20 Claims, 10 Drawing Sheets

(56) References Cited

U.S. PATENT DOCUMENTS

| | | | |
|---|---|---|---|
| 2005/0018180 A1* | 1/2005 | Ayres | G01M 11/005 356/237.1 |
| 2005/0252622 A1* | 11/2005 | Reid | E06B 7/32 160/180 |
| 2008/0087828 A1* | 4/2008 | Vickers | G21K 1/025 250/363.1 |
| 2009/0049599 A1* | 2/2009 | Parsons | E03C 1/057 4/623 |
| 2010/0225929 A1* | 9/2010 | Yeh | G01S 5/16 356/615 |
| 2011/0248152 A1* | 10/2011 | Svajda | G01S 3/7803 250/221 |
| 2011/0273378 A1* | 11/2011 | Alameh | H04M 1/72569 345/173 |
| 2011/0297832 A1* | 12/2011 | Yao | G01S 7/4813 250/353 |
| 2012/0267541 A1* | 10/2012 | Utukuri | G01D 5/34 250/394 |
| 2012/0295665 A1* | 11/2012 | Pantfoerder | G01J 1/0214 455/566 |
| 2013/0106813 A1* | 5/2013 | Hotelling | G06F 1/3265 345/207 |
| 2013/0207936 A1* | 8/2013 | Theimer | G06F 3/0488 345/175 |
| 2013/0240739 A1* | 9/2013 | Shpater | G08B 29/046 250/353 |
| 2013/0310743 A1* | 11/2013 | Yagi | A61M 5/16836 604/111 |
| 2014/0098375 A1* | 4/2014 | Liesener | G01B 9/02044 356/498 |
| 2014/0208128 A1* | 7/2014 | Gyorfi | G06F 9/542 713/300 |
| 2015/0029086 A1* | 1/2015 | Mankowski | G06F 3/017 345/156 |
| 2015/0281428 A1* | 10/2015 | Alameh | H04M 1/72569 455/566 |
| 2016/0202114 A1* | 7/2016 | Alameh | G01J 1/0233 250/339.02 |
| 2016/0203709 A1* | 7/2016 | Alameh | G08C 23/04 340/12.1 |
| 2016/0205236 A1* | 7/2016 | Alameh | H04M 1/72569 455/566 |
| 2016/0266228 A1* | 9/2016 | Clemen, Jr. | G01S 3/782 |
| 2016/0344856 A1* | 11/2016 | Alameh | H04M 1/725 |
| 2016/0345264 A1* | 11/2016 | Alameh | H04W 52/0229 |
| 2016/0350553 A1* | 12/2016 | Alameh | G06F 21/74 |

* cited by examiner

PORTABLE ELECTRONIC DEVICE PROXIMITY SENSORS WITH MULTI-DIRECTIONAL FUNCTIONALITY

BACKGROUND

Technical Field

This disclosure relates generally to electronic devices, and more particularly to portable electronic devices having proximity sensors.

Background Art

Proximity sensors detect the presence of nearby objects before those objects contact the device in which the proximity sensors are disposed. Illustrating by example, some proximity sensors emit an electromagnetic or electrostatic field. A receiver then receives reflections of the field from the nearby object. The proximity sensor detects changes in the received field to detect positional changes of nearby objects based upon changes to the electromagnetic or electrostatic field resulting from the object becoming proximately located with a sensor.

While prior art proximity detectors are useful for determining when an object is close to an electronic device, prior art proximity detectors generally have difficulty determining where an object may be relative to the device. It would be advantageous to have an improved proximity sensor and associated systems and devices.

Figure 1:
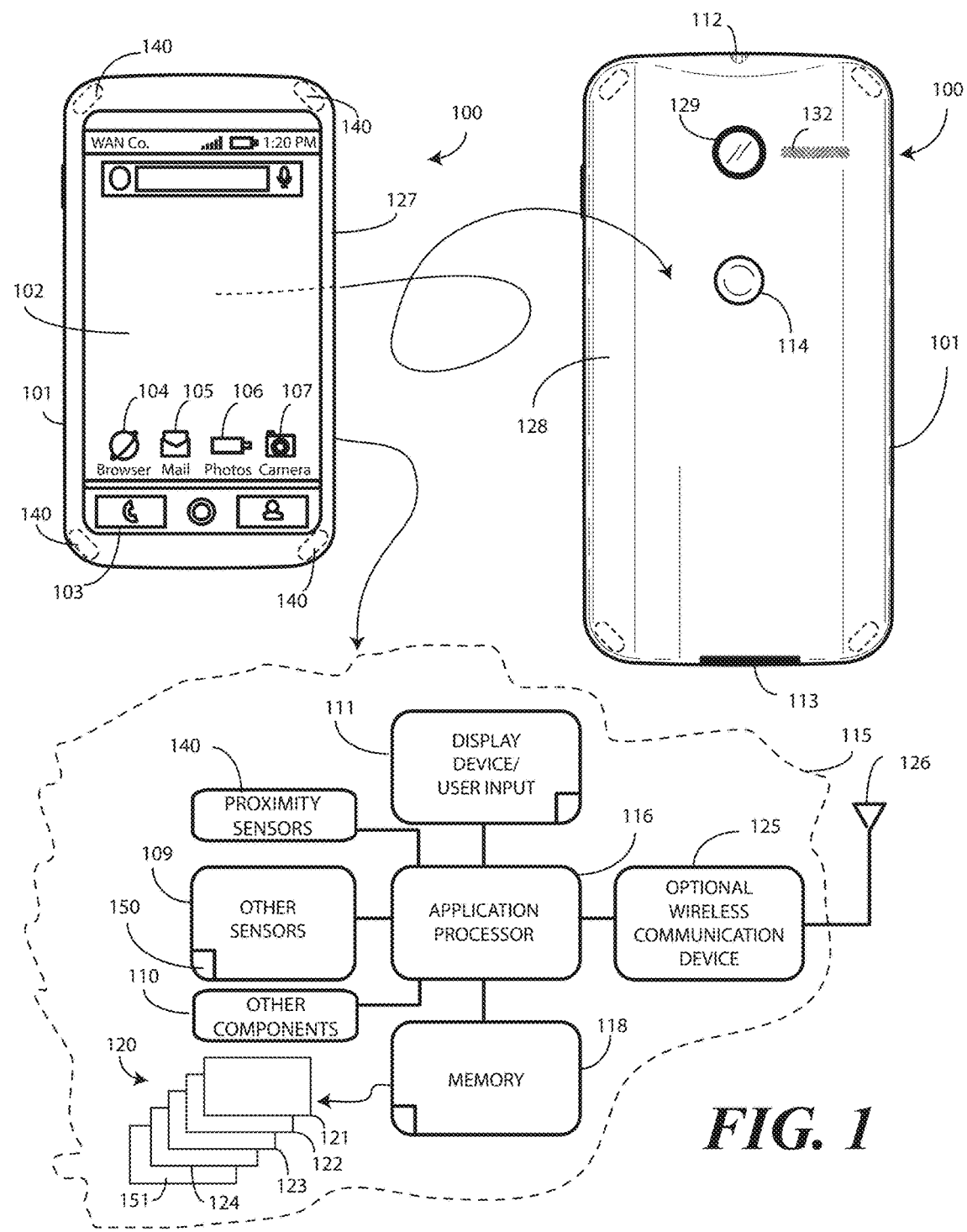
FIG. 1 illustrates one explanatory portable electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to using proximity sensor components to detect objects from different directions relative to an electronic device. Any process descriptions or blocks in flow charts should be understood as representing modules, segments, or portions of code that include one or more executable instructions for implementing specific logical functions or steps in the process.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of determining, with proximity sensors, whether received infrared emissions are attenuated to determine from which direction those emissions originated. The non-processor circuits may include, but are not limited to, a radio receiver, a radio transmitter, signal drivers, clock circuits, power source circuits, and user input devices. As such, these functions may be interpreted as steps of a method to determine from what direction infrared emissions are received. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device, which may be portable in one or more embodiments, having a housing. The housing can include a front major face, a rear major face, and one or more side edges. In one embodiment, a display or other user interface component is disposed along the front major face. One or more processors can be operable with the display or user interface.

In one embodiment, the electronic device has at least one proximity sensor component that is operable with the one or more processors. In one embodiment, the at least one proximity sensor component comprises a receiver only, and does not include a corresponding transmitter. As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter.

Illustrating by example, in one the proximity sensor component comprises a signal receiver to receive signals from objects external to the housing of the electronic device. In one embodiment, the signal receiver is an infrared signal receiver to receive an infrared emission from an object such as a human being when the human is proximately located with the electronic device. In one or more embodiments, the proximity sensor component is configured to receive infrared wavelengths of about four to about ten micrometers. This wavelength range is advantageous in one or more embodiments in that it corresponds to the wavelength of heat emitted by the body of a human being. Additionally, detection of wavelengths in this range is possible from farther distances than, for example, would be the detection of reflected signals from the transmitter of a proximity detector component.

In one or more embodiments, each proximity sensor component is disposed adjacent to at least two sides of the electronic device. For example, in one embodiment a proximity sensor component is disposed at an edge of the device adjacent to one or more major faces of the electronic device and at least one minor edge. In another embodiment, a proximity sensor component can be disposed at a corner of the electronic device adjacent to one or more major faces and at least two minor edges.

The proximity sensor components receive infrared emissions through one or more apertures in the housing. In one embodiment, to provide directional determination functionality, multiple apertures are disposed adjacent to a single proximity sensor component. For example, in one embodiment where the proximity sensor component is disposed at an edge of the electronic device, a first aperture can be disposed along a major face while a second aperture is disposed along a minor edge. This results in the proximity sensor component being disposed adjacent to at least a first aperture in the housing having a first axis oriented in a first direction, e.g., normal to the major face, and a second aperture in the housing having a second axis oriented in a second direction different from the first direction, e.g., normal to the minor edge.

In one embodiment, the thermal path through one of the apertures is attenuated more than another. For example, in one embodiment the first aperture defines a first aperture area that is less than a second aperture area defined by the second aperture so as to attenuate infrared emissions passing through the first aperture to the proximity sensor component more than those passing through the second aperture. In another embodiment, a thermal attenuator layer or material is disposed between the first aperture and the proximity sensor component. Regardless of configuration, this results in infrared emissions passing through one aperture being attenuated more than if the same infrared emission had passed through the other aperture.

This difference in attenuation causes the proximity sensor component receiving a "maximum level" signal through one aperture that reaches a maximum at a lower level than from the other aperture. For example, if infrared emissions received by the proximity sensor component without attenuation resulted in signals of between zero and one volt, the attenuation would reduce this dynamic range. Accordingly, signals received through the smaller aperture or the aperture with the thermal attenuator may have a dynamic range of zero and one-half volt. By determining whether the maximum is above or below a predefined threshold that is a function of the attenuation, one or more processors operable with the proximity sensor component can determine from which direction the infrared emission was received. This functionality can be used to distinguish touch or gestures from one side of the electronic device from those occurring along another side of the device with a common proximity sensor component. Applications operable on the one or more processors can use this directional functionality to distinguish edge interactions from those above a major face of the device.

In one or more embodiments, each proximity sensor component is disposed about a perimeter of the housing along minor faces of the housing, and adjacent to one or more major faces of the electronic device. For example, in one explanatory embodiment four proximity sensor components are disposed at the corners of the housing. A first aperture can be disposed along a major face of the electronic device, while a second aperture can be disposed along an edge of the electronic device. Thus, the axis of the first aperture would be substantially orthogonal with the axis of the second aperture.

In other embodiments, additional proximity sensors can be included. For example, in another embodiment four proximity sensors can be disposed at corners of the device while four additional proximity sensors are disposed along the sides of the housing. This results in eight proximity sensors being used. While the use of additional proximity sensor components can help to increase location and distance resolution, they also increase the cost. Thus, in one embodiment four or fewer proximity sensor components, disposed generally at the corners of the electronic device, are used.

In one embodiment, the aperture disposed along the minor edge of the electronic device adjacent to each proximity sensor component is configured as a plurality of apertures defining a grille. The use of a plurality of apertures, as opposed to a single aperture, can advantageously define a plurality of distinct reception beams that can define a thermal reception angle. As used herein, a "thermal reception beam" includes any region, zone, or path through which thermal emissions can travel to reach a proximity sensor component. Exposure to the proximity sensor component through any one aperture defines a directionality associated with the thermal reception beams, and also defines the region, zone, or path through which thermal emissions can reach the proximity sensor component. In effect, each thermal reception beam defines a spatially defined, three-dimensional, exposed area through which a thermal emission can reach the proximity sensor component. Accordingly, a thermal reception beam can be considered to be a thermal reception zone, a thermal reception area, or a thermal reception path as used herein.

In one embodiment, to achieve a full 360-degree proximity detection coverage about the minor edges of the electronic device, each reception angle can be configured by the plurality of apertures to be obtuse, i.e., greater than ninety degrees. This allows the reception angle of any one proximity sensor component to overlap the reception angle of at least one other proximity sensor component. In one embodiment, where four proximity sensor components are disposed at the corners of the housing, the reception angle of any one proximity sensor component overlaps at least two other reception angles of at least two other proximity sensor components to provide 360-degree coverage about the minor edges of the electronic device.

In one embodiment the housing defines at least two apertures adjacent to each proximity sensor component that point in different directions with no overlap in coverage. For example, a first aperture can have a first axis oriented in a first direction while a second aperture has an axis that is oriented in a second direction that is different from the first direction. For example, a first aperture can allow infrared emissions to translate generally normally to the major face to reach the proximity sensor component, while the second aperture can allow infrared emissions transmitting generally normally to the minor edge to reach the proximity sensor component. These two apertures can define reception beams oriented in different directions. Where, for example, the aperture is disposed along the front of the electronic device, the first aperture can define one or more reception beams oriented at least partially away from the front of the device. If the second aperture is disposed along a side edge, it can define one or more reception beams oriented at least partially away from the edges of the device. This "different direction reception capability with a common proximity sensor component" configuration can be used to determine from which direction infrared emissions are received, as will be explained in more detail below with reference to FIGS. 3 and 4.

In one embodiment, the one or more processors operate in conjunction with the plurality of proximity detector components to detect a person is within a thermal reception radius of the electronic device along a first direction, and then detect user input such as gesture input or touch input along a second direction but with the same proximity sensor component. The distinction can be made by determining whether the signal is attenuated as will be explained in more detail below.

Turning now to FIG. 1, illustrated therein is one explanatory electronic device 100 configured in accordance with one or more embodiments of the disclosure. The electronic device 100 of FIG. 1 is a portable electronic device, and is shown as a smart phone for illustrative purposes. However, it should be obvious to those of ordinary skill in the art having the benefit of this disclosure that other electronic devices may be substituted for the explanatory smart phone of FIG. 1. For example, the electronic device 100 could equally be a conventional desktop computer, palm-top computer, a tablet computer, a gaming device, a media player, or other device.

This illustrative electronic device 100 includes a display 102, which may optionally be touch-sensitive. In one embodiment where the display 102 is touch-sensitive, the display 102 can serve as a primary user interface 111 of the electronic device 100. Users can deliver user input to the display 102 of such an embodiment by delivering touch input from a finger, stylus, or other objects disposed proximately with the display. In one embodiment, the display 102 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 100 of FIG. 1 includes a housing 101. In one embodiment, the housing 101 includes two housing members. A front housing member 127 is disposed about the periphery of the display 102 in one embodiment. A rear-housing member 128 forms the backside of the electronic device 100 in this illustrative embodiment and defines a rear major face of the electronic device. Features can be incorporated into the housing members 127,128. Examples of such features include an optional camera 129 or an optional speaker port 132, which are shown disposed on the rear major face of the electronic device 100 in this embodiment, but could be disposed along the front major face of the electronic device 100 as well about the display 102. In this illustrative embodiment, a user interface component 114, which may be a button or touch sensitive surface, can also be disposed along the rear-housing member 128.

In one embodiment, the electronic device 100 includes one or more connectors 112,113, which can include an analog connector, a digital connector, or combinations thereof. In this illustrative embodiment, connector 112 is an analog connector disposed on a first minor edge, i.e., the top edge, of the electronic device 100, while connector 113 is a digital connector disposed on a second minor edge opposite the first minor edge, which is the bottom edge in this embodiment.

A block diagram schematic 115 of the electronic device 100 is also shown in FIG. 1. In one embodiment, the electronic device 100 includes one or more processors 116. In one embodiment, the one or more processors 116 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 118, can optionally store the executable software code used by the one or more processors 116 during operation.

In this illustrative embodiment, the electronic device 100 also includes a communication circuit 125 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 125 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 125 can include wireless communication circuitry, one of a receiver, a transmitter, or transceiver, and one or more antennas 126.

In one embodiment, the one or more processors 116 can be responsible for performing the primary functions of the electronic device 100. For example, in one embodiment the one or more processors 116 comprise one or more circuits operable with one or more user interface devices 111, which can include the display 102, to present presentation information to a user. The executable software code used by the one or more processors 116 can be configured as one or more modules 120 that are operable with the one or more processors 116. Such modules 120 can store instructions, control algorithms, and so forth.

In one embodiment, the one or more processors 116 are responsible for running the operating system environment 121. The operating system environment 121 can include a kernel 122 and one or more drivers, and an application service layer 123, and an application layer 124. The operating system environment 121 can be configured as executable code operating on one or more processors or control circuits of the electronic device 100.

The application layer 124 can be responsible for executing application service modules. The application service modules may support one or more applications or "apps." Examples of such applications shown in FIG. 1 include a cellular telephone application 103 for making voice telephone calls, a web browsing application 104 configured to allow the user to view webpages on the display 102 of the electronic device 100, an electronic mail application 105 configured to send and receive electronic mail, a photo application 106 configured to permit the user to view images or video on the display 102 of electronic device 100, and a camera application 107 configured to capture still (and optionally video) images. These applications are illustrative only, as others will be obvious to one of ordinary skill in the art having the benefit of this disclosure. The applications of the application layer 124 can be configured as clients of the application service layer 123 to communicate with services through application program interfaces (APIs), messages, events, or other inter-process communication interfaces. Where auxiliary processors are used, they can be used to execute input/output functions, actuate user feedback devices, and so forth.

In one embodiment, a plurality of proximity sensor components 140 can be operable with the one or more processors 116. In one embodiment, the proximity sensor components 140 comprise only signal receivers. In one embodiment, the proximity sensor components 140 comprise infrared receivers. For example, in one embodiment the proximity sensor components 140 comprise signal receivers that receive infrared wavelengths of about 860 nanometers. In one embodiment, the proximity sensor components 140 have a relatively long detection range so as to detect heat emanating from a person's body when that person is within a predefined thermal reception radius. For example, the proximity sensor component may be able to detect a person's body heat from a distance of about ten feet in one or more embodiments where the person's infrared emissions are not attenuated. The ten-foot dimension can be extended as a function of designed coverage optics, sensor active area, gain, lensing gain, and so forth.

In one embodiment, each proximity sensor component 140 comprises an infrared signal receiver so as to be able to detect infrared emissions from a person. This is sometimes referred to as a "passive IR system" due to the fact that the person is the active transmitter. Accordingly, the proximity sensor component 140 requires no transmitter since objects disposed external to the housing deliver emissions that are received by the infrared receiver. As no transmitter is required, each proximity sensor component 140 can operate at a very low power level. Simulations show that each infrared signal receiver can operate with a total current drain of less than 10 microamps.

Figure 2:
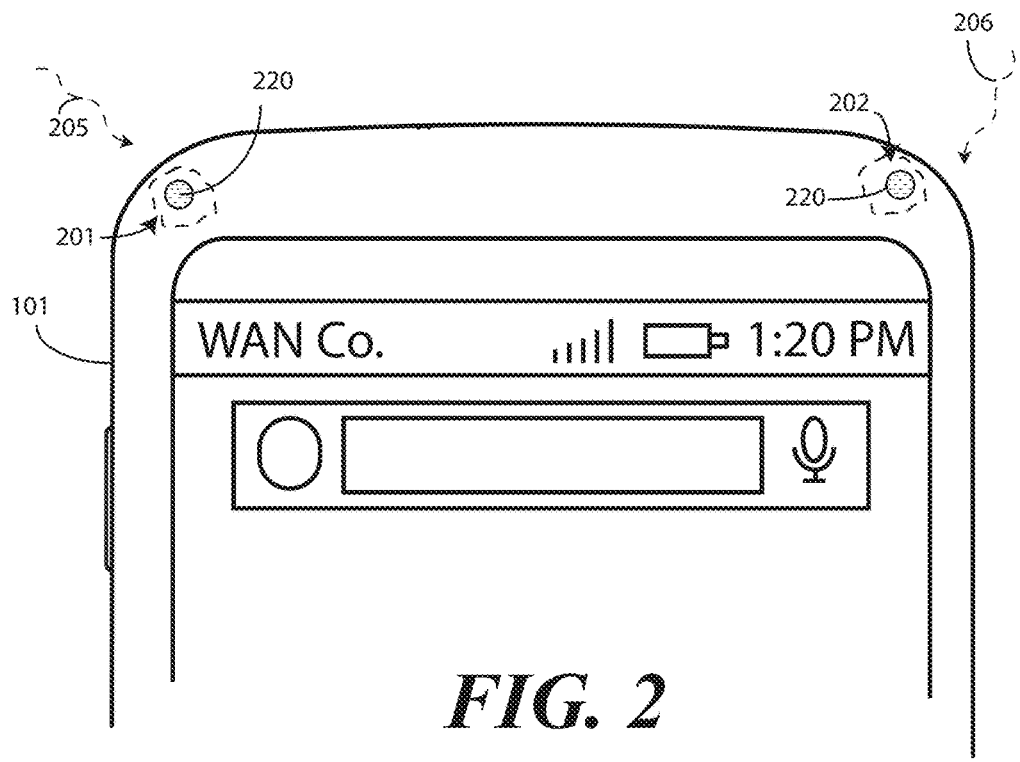
FIG. 2 illustrates explanatory proximity sensor component configurations in accordance with one or more embodiments of the disclosure.

Turning briefly to FIG. 2, illustrated therein are two proximity sensor components 201,202, each disposed at a corner of the electronic device 100. In this embodiment, each proximity sensor component 201,202 comprises a signal receiver 220, such as an infrared receiver that is a thermopile-type passive heat sensor that includes a collection of thermo-junctions that generate voltage differentials when subjected to heat, to detect an infrared emission 205,206 from an object external to the housing 101 of the electronic device 100. No corresponding transmitter is included or required for the proximity sensor component 201,202 to function. As no active transmitter emitting signals is included, each proximity sensor component 201,202 is sometimes referred to as a "passive" proximity sensor. In one embodiment, the proximity sensor components 201,202 can include at least two sets of components. For example, a first set of components can be disposed at a first corner of the electronic device 100, while another set of components can be disposed at a second corner of the electronic device 100.

Figure 3:
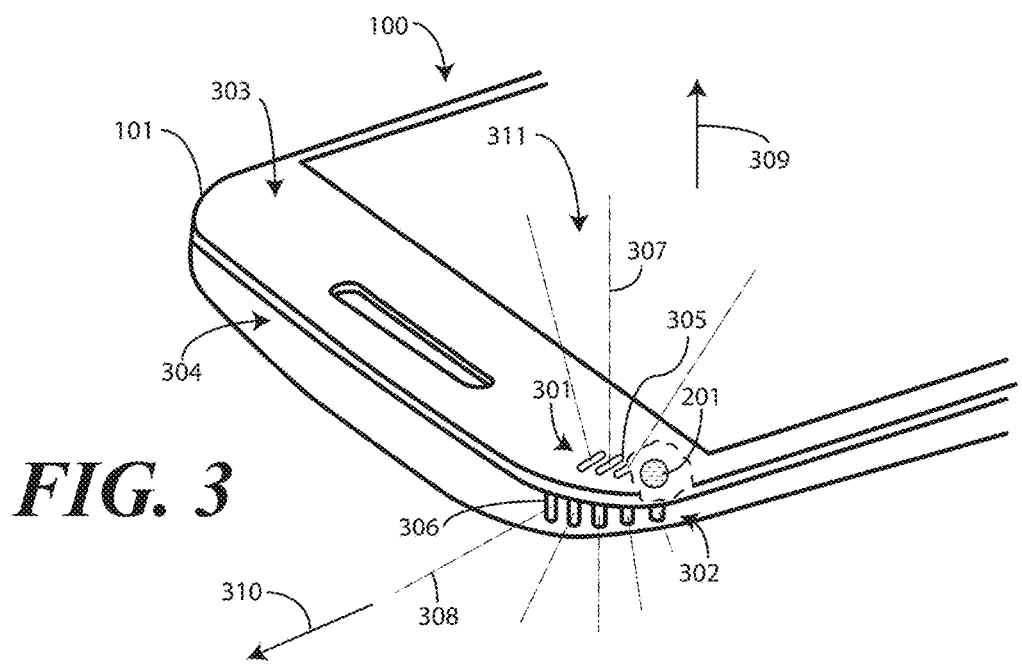
FIG. 3 illustrates one explanatory proximity sensor component configuration in accordance with one or more embodiment of the disclosure.

In one or more embodiments, the housing 101 defines a first aperture and a second aperture adjacent to each proximity sensor component 201,202 so that the infrared emission 205,206 can be received from at least two different directions defined by axes of these apertures. Turning now to FIG. 3, one such embodiment is shown.

In FIG. 3. proximity sensor component 201 is disposed adjacent to two sets of apertures 301,302. A first set of apertures 301 is disposed along a major face 303 of the electronic device 100, while a second set of apertures 302 is disposed along a minor edge 304 of the electronic device 100. Each aperture in the sets of apertures 301,302 has an axis associated therewith. For example, a first aperture 305 in the first set of apertures 301 has a first axis 307 oriented in a first direction 309 that is substantially normal relative to the major face 303 of the electronic device 100.

Similarly, an aperture 306 of the second set of apertures 302 has a second axis 308 oriented in a second direction 310 that is different from the first direction 309. In this illustrative embodiment, the first direction 309 is substantially orthogonal relative to the second direction 310. The term "substantially," as used herein, refers to an orientation inclusive of manufacturing and design tolerances. For example, if the minor edge 304 of the electronic device 100 were designed to extend 88 degrees from the major face 303 to facilitate extraction from a mold and had a manufacturing tolerance of plus or minus one degree, any angle between and including 87 and 89 degrees would be "substantially" orthogonal. While the first direction 309 and the second direction 310 are substantially orthogonal relative to each other in one embodiment, other relationships can be used as well. In another embodiment, an angle defined by the first direction 309 and the second direction 310 can be obtuse. In yet another embodiment, the angle defined by the first direction 309 and the second direction 310 can be acute. Other relationships will be obvious to those of ordinary skill in the art having the benefit of this disclosure.

It should be noted that each aperture in the first set of apertures 301 and each aperture in the second set of apertures 302 can have axes that are substantially parallel in one embodiment. Where this is the case, the reception beam 311 defined along the first direction 309 would be narrower than, for example, if the axes from the apertures defining the first set of apertures 301 were divergent as they extended away from the major face 303. The same can be true for the second set of apertures 302 as well. Also, while each set of apertures 301,302 includes a plurality of apertures, a single aperture could be substituted for either or both sets of apertures 301,302 in another embodiment.

In one or more embodiments, the one or more processors (116) operable with the proximity sensor components 201 can determine from which direction 309,310 infrared emissions are received by determining through which aperture or set of apertures 301,302 the infrared emission was received. For example, in the illustrative embodiment of FIG. 3, if infrared emissions were received through the first set of apertures 301, i.e., from the first direction 309, the one or more processors (116) may conclude that those infrared emissions correspond to user input since they are the result of user interaction occurring above the display 102. However, where the infrared emissions are received through the second set of apertures 302, i.e., from the second direction 310, the one or more processors (116) may use such input for object detection only rather than as user input.

In one embodiment, this determination is made as a function of infrared emission attenuation. Embodiments of the disclosure contemplate that if infrared emissions through one aperture or set of apertures 301 are attenuated with respect to another aperture or set of apertures 302, the maximum signal received through the attenuated apertures will be less than the maximum signal received through the lesser or non-attenuated apertures. Accordingly, attenuated and lesser or non-attenuated infrared emissions will have different dynamic ranges as seen by the proximity sensor component 201. Thus, by comparing this maximum signal to a threshold, the one or more processors (116) can determine if received infrared emissions are attenuated. From this determination, the one or more processors (116) can determine whether the received infrared emissions came from the first direction 309 or the second direction 310. Two embodiments illustrating how this can be done will be described with reference to FIGS. 4 and 5 below.

Figure 4:
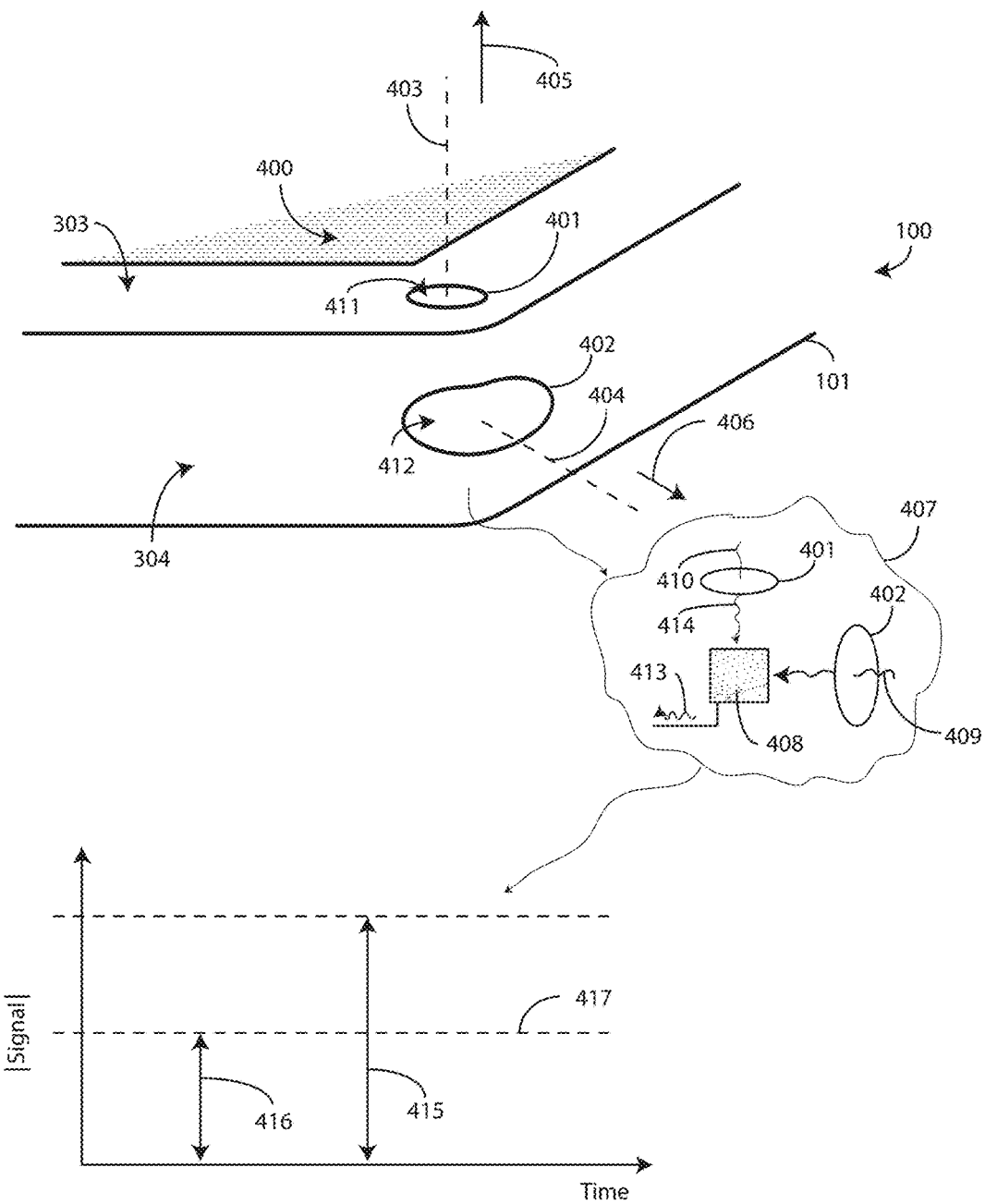
FIG. 4 illustrates one explanatory proximity sensor component configuration in accordance with one or more embodiment of the disclosure.

Beginning with FIG. 4, a section 400 of the housing 101 of the electronic device 100 is shown. The housing 101 includes at least a first aperture 401 having a first axis 403 oriented in a first direction 405. The housing 101 also includes a second aperture 402 having a second axis 404 oriented in a second direction 406 that is different from the first direction 405. While the first aperture 401 and the second aperture 402 are shown as single apertures for illustrative purposes, it should be noted that one or both of the first aperture 401 and the second aperture 402 could comprise multiple apertures as described above. Also, while the first direction 405 is substantially orthogonally oriented relatively to the second direction 406 in this example, the first direction 405 and second direction 406 could define obtuse or acute angles as previously described. In this illustrative embodiment, the first direction 405 is oriented substantially orthogonally with a major face 303 of the housing 101, while the second direction 406 is oriented substantially orthogonally with a minor edge 304 of the housing 101.

A system-level diagram 407 is also shown in FIG. 4. A proximity sensor component (201), which is disposed within the housing 101, includes an infrared signal receiver 408 to receive an infrared emission 409,410 from an object external to the housing 101. As shown, the infrared signal receiver 408 is disposed adjacent to the first aperture 401 and the second aperture 402 within the housing 101.

In this illustrative embodiment, the first aperture 401 defines a first aperture area 411 that is less than a second aperture area 412 defined by the second aperture 402. In one embodiment, the first aperture area 411 is less than or equal to half the second aperture area 412, although other ratios could be used as well. This reduced aperture area is to attenuate infrared emissions 410 passing through the first aperture 401 to the infrared signal receiver 408 of the proximity sensor component (201) more than infrared emissions 409 passing through the second aperture 402. As shown in the system-level diagram 407, infrared emission 410 gets attenuated to become an attenuated infrared emission 414.

When the infrared emission 410 is attenuated, this results in a dynamic range 416 of signals 413 generated by the infrared signal receiver 408 as a function of the attenuated infrared emission 414 being less than the dynamic range 415 of signals 413 generated by the infrared signal receiver 408 as a function of the lesser or non-attenuated infrared emission 409. In this illustration, since the first aperture area 411 is half the second aperture area 412, the dynamic range 416 corresponding to the attenuated infrared emission 414 is half a fraction of the dynamic range 415 of the lesser or non-attenuated infrared emission 409, which in this case is one-third of the dynamic range 415 of the lesser or non-attenuated infrared emission 409. Using voltage as a measure of magnitude of these signals 413, the dynamic range 416 of the attenuated infrared emission 414 might be 0-0.5 volts, while the dynamic range 415 of the lesser greater or non-attenuated infrared emission 409 might be 0-1 volts. These levels are illustrative only, as others will result from different system architectures, logic systems, and so forth.

Thus, the attenuation results in the dynamic range 416 of the attenuated infrared emission 414 remaining below a predetermined threshold 417 defined by the maximum magnitude of the signal 413 generated as a function of the attenuated infrared emission 414. The one or more processors (116), which are operable with the infrared signal receiver 408, can use this information to determine whether a received infrared emission was received through the first aperture 401, i.e., along the first direction 405, or through the second aperture 402, i.e., along the second direction 406. The one or more processors (116) can make this determination by determining whether a magnitude of the signal 413 corresponding to a received infrared emission exceeds the predetermined threshold 417. If it does, the infrared emission 409 was received through the second aperture 402. If not, it likely came through the first aperture 401. Accordingly, the one or more processors (116) can determine whether the infrared emission was received from the first direction 405 or the second direction 406.

Techniques other than signal magnitude or dynamic range can be used to determine whether a received infrared emission is attenuated or non-attenuated. For example, in another embodiment the one or more processors (116) can determine the root mean squared value of the signal 413 generated as a function of a received infrared emission to determine whether it is above or below the predetermined threshold 417. In another embodiment, the one or more processors (116) can calculate an average value of the signal 413 generated as a function of the received infrared emission to determine whether it is above or below the predetermined threshold 417. In addition, the changes in this signal can be captured over time and analyzed to make further inferences as to the interaction with the apertures. Still other techniques will be obvious to those of ordinary skill in the art having the benefit of this disclosure.

Figure 5:
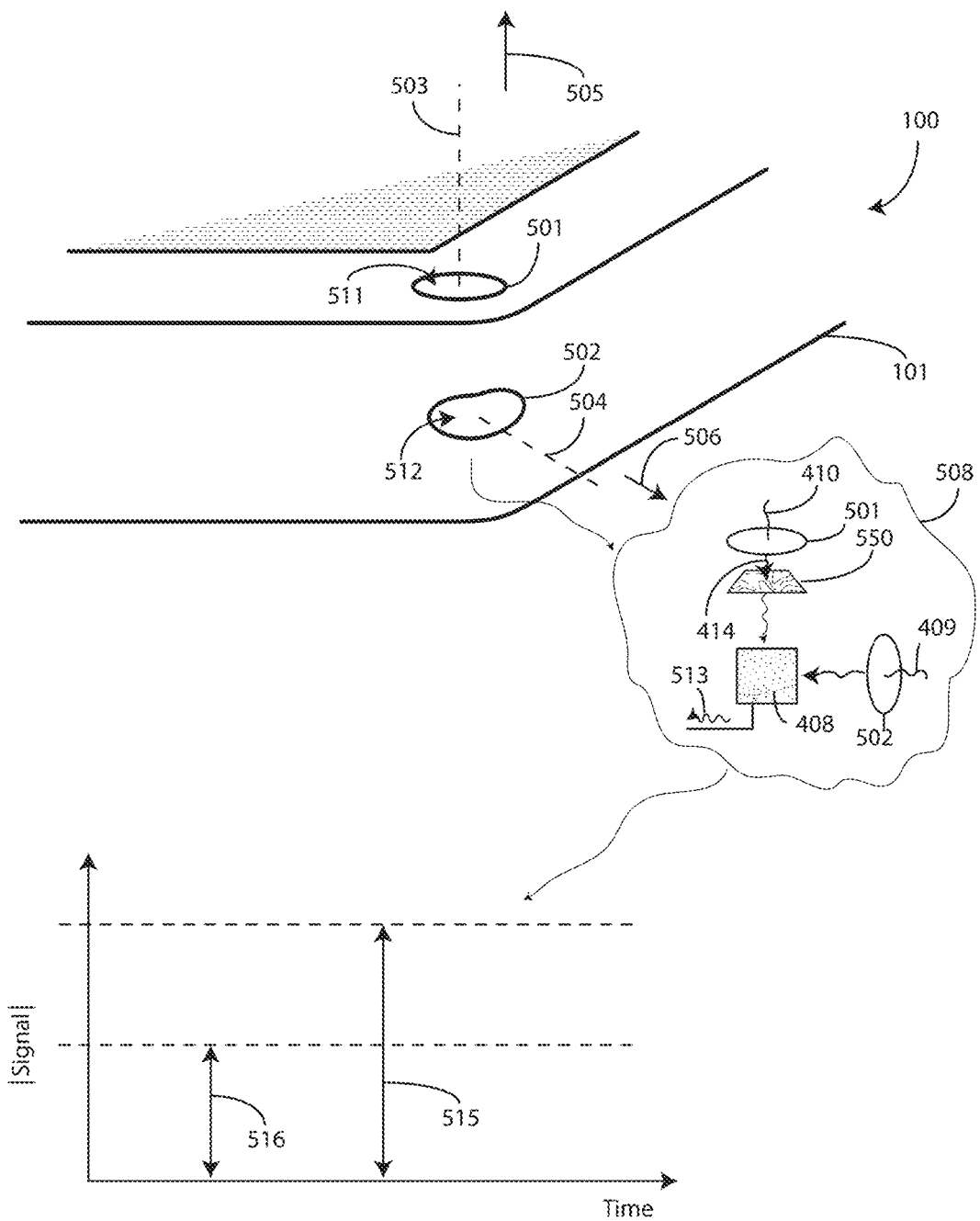
FIG. 5 illustrates one explanatory proximity sensor component configuration in accordance with one or more embodiment of the disclosure.

Turning now to FIG. 5, illustrated therein is an alternate embodiment of the electronic device 100 is shown. As was the case with FIG. 4, the housing 101 includes at least a first aperture 501 having a first axis 503 oriented in a first direction 505. The housing 101 also includes a second aperture 502 having a second axis 504 oriented in a second direction 506 that is different from the first direction 505. As was the case with the embodiment of FIG. 4, the first aperture 501 and the second aperture 502 could comprise multiple apertures rather than single apertures.

A system-level diagram 508 depicts a proximity sensor component (201), which is disposed within the housing 101, including an infrared signal receiver 408 to receive an infrared emission 409,410 from an object external to the housing 101. As shown, the infrared signal receiver 408 is disposed adjacent to the first aperture 501 and the second aperture 502 within the housing 101.

Rather than being different sizes, in this illustrative embodiment, the first aperture 501 defines a first aperture area 511 that is equal to a second aperture area 512 defined by the second aperture 502. Accordingly, the first aperture 501 and the second aperture 502 apply either no attenuation or a common attenuation to the infrared emissions 409,410 passing therethrough. A thermal attenuator 550 is disposed between the first aperture 501 and infrared signal receiver 408 and is to attenuate infrared emissions 410 passing through the first aperture 401 501 to the infrared signal receiver 408. One example of such a thermal attenuator 550 is a heat-absorbing filter. Others will be obvious to those of ordinary skill in the art having the benefit of this disclosure.

In one embodiment, the thermal attenuator 550 is to attenuate the infrared emission 410 passing through the first aperture 501 by at least half. However, other thermal attenuators having other attenuation amounts could be used as well. As with FIG. 4, the inclusion of the thermal attenuator is to attenuate infrared emissions 410 passing through the first aperture 501 to the infrared signal receiver 408 of the proximity sensor component (201) more than infrared emissions 409 passing through the second aperture 502. As shown in the system-level diagram 508, infrared emission 410 gets attenuated to become an attenuated infrared emission 414.

When the infrared emission 410 is attenuated, this results in a dynamic range 516 of signals 513 generated by the infrared signal receiver 408 as a function of the attenuated infrared emission 414 being less than the dynamic range 515 of signals 513 generated by the infrared signal receiver 408 as a function of the lesser greater or non-attenuated infrared emission 409. Accordingly, the one or more processors (116) can determine whether a received infrared emission is attenuated to detect whether the received infrared emission was received from the first direction 505 or the second direction 506 as previously described. In other words, when the opening is touched by the hand or finger, an attenuated signal will reach its maximum level at a value that is less than if the signal had been an un-attenuated one. This maximum level indicates the device is being touched.

While two different techniques for determining from which direction infrared emissions are received have been explained above with reference to FIGS. 4 and 5, it should be noted that others will be obvious to those of ordinary skill in the art having the benefit of this disclosure. For example, in yet another embodiment the thermal attenuator 550 can include a lens that results in any infrared emission passing through the lens interacting with the proximity sensor component (201) differently from emissions passing through the other aperture. The inclusion of such a lens allows for the detection of an approaching finger at an opening, thus allowing the detection of which opening the user is touching and/or approaching prior to the touch event occurring by changing an amount of coupling to the proximity sensor component (201) based upon distance to create a unique coupling profile.

Figure 6:
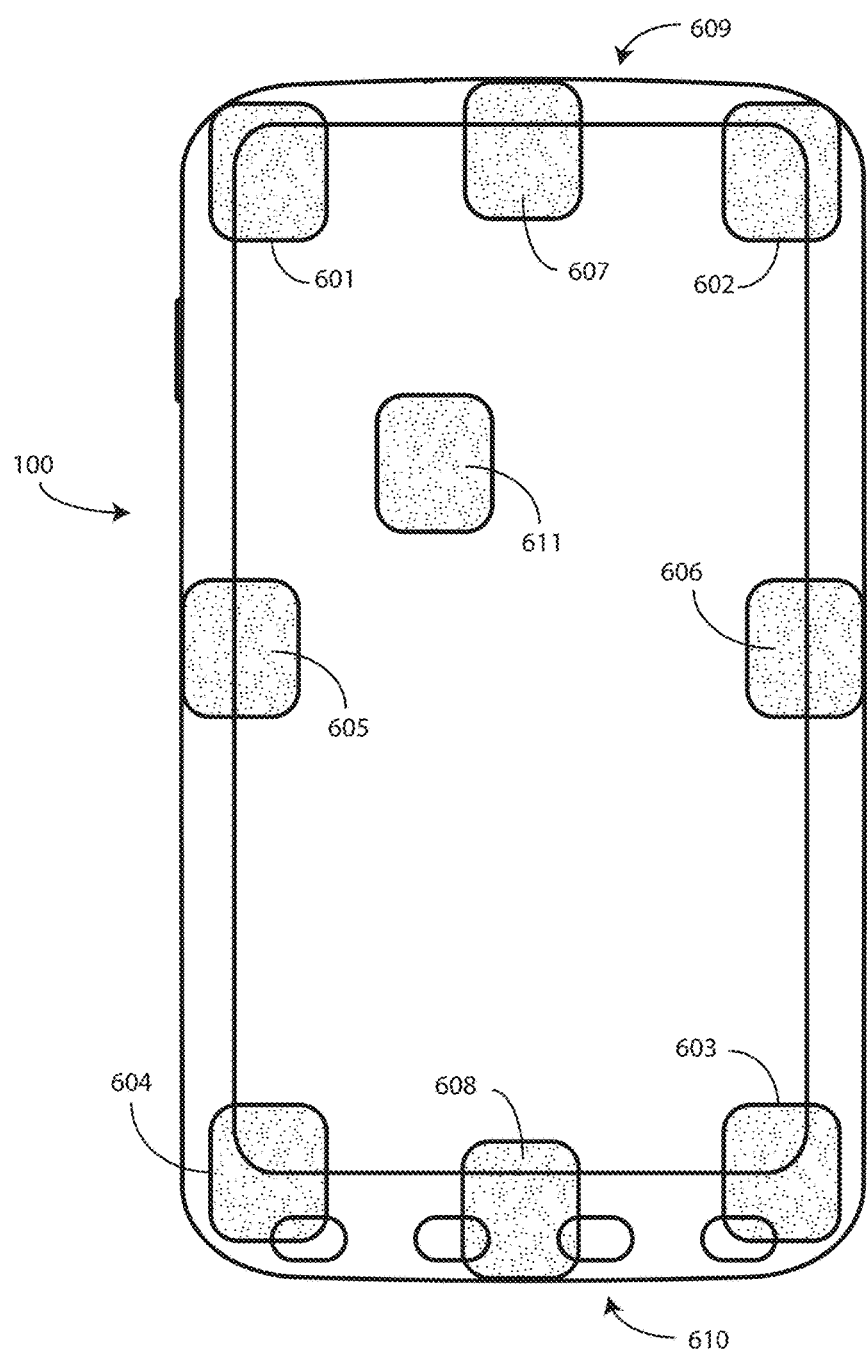
FIG. 6 illustrates explanatory locations along an electronic device where one or more proximity sensor components can be disposed in accordance with one or more embodiments of the disclosure.

It should be noted that proximity sensor components can be placed in any of a variety of locations along an electronic device. Turning now to FIG. 6, illustrated therein are some of the many locations at which proximity sensor components may be located. These locations include corner locations 601,602,603,604, in which one aperture can be disposed along a major face and another can be disposed along a minor edge. The locations can also include edge locations 605,606 and end locations 607,608, in which one aperture can be disposed along a major face and another can be disposed along a minor edge. Other locations and combinations will be obvious to those of ordinary skill in the art having the benefit of this disclosure. For example, a proximity sensor component could be located in a central location 611 along the electronic device 100, with a first aperture disposed along the front major face and a second aperture disposed along the rear major face to allow user control from either side of the electronic device 100.

In one or more embodiments, the plurality of proximity sensor components comprises only four proximity sensor components disposed only at the corner locations 601,602, 603,604 of the housing 101 on a one-proximity sensor component to one corner location basis, respectively, with apertures configured as shown in FIG. 3 above. In one embodiment, two corner locations 601,602 are disposed at a first end 609 of the electronic device 100, while the two other corner locations 603,604 are disposed at a second end 610 of the electronic device 100. In this illustrative embodiment, the first end 609 is the top of the electronic device 100, while the second end 610 is the bottom of the electronic device 100. Where each proximity sensor component includes obtuse, overlapping reception angles, a 360-degree coverage about the housing 101 can be achieved using only four proximity sensor components.

Turning now back to FIG. 1, in one embodiment, the one or more processors 116 may generate commands based on information received from one or more proximity sensor components 140. The one or more processors 116 may generate commands based upon information received from a combination of the one or more proximity sensor components 140 and one or more other sensors 109. The one or more processors 116 may process the received information alone or in combination with other data, such as the information stored in the memory 118.

The one or more other sensors 109 may include a microphone, and a mechanical input component such as button or key selection sensors, touch pad sensor, touch screen sensor, capacitive sensor, and switch. Touch sensors may used to indicate whether the device is being touched at side edges, thus indicating whether or not certain orientations or movements are intentional by the user. The other sensors 109 can also include surface/housing capacitive sensors, audio sensors, and video sensors (such as a camera).

The other sensors 109 can also include motion detectors, such as an accelerometer or a gyroscope. For example, an accelerometer may be embedded in the electronic circuitry of the electronic device 100 to show vertical orientation, constant tilt and/or whether the device is stationary.

Other components 110 operable with the one or more processors 116 can include output components such as video, audio, and/or mechanical outputs. For example, the output components may include a video output component such as the display 102 or auxiliary devices including a cathode ray tube, liquid crystal display, plasma display, incandescent light, fluorescent light, front or rear projection display, and light emitting diode indicator. Other examples of output components include audio output components such as speaker port 132 or other alarms and/or buzzers and/or a mechanical output component such as vibrating or motion-based mechanisms.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

By determining from which direction the infrared emission is received, embodiments of the disclosure can treat infrared emissions differently. For example, infrared emissions received from an edge of a device may be used to detect that a person is within a thermal reception radius of the electronic device. By contrast, infrared emissions received from above a major face of the electronic device can be used as user input, such as gesture input or touch input. Accordingly, the one or more processors of the electronic device may perform some operations, such as waking the display, when infrared emissions are received from the edge of the device. However, the one or more processors may perform other control operations, in response to user input, when infrared emissions are received from the front of the device. This will be illustrated with a few examples.

Figure 7:
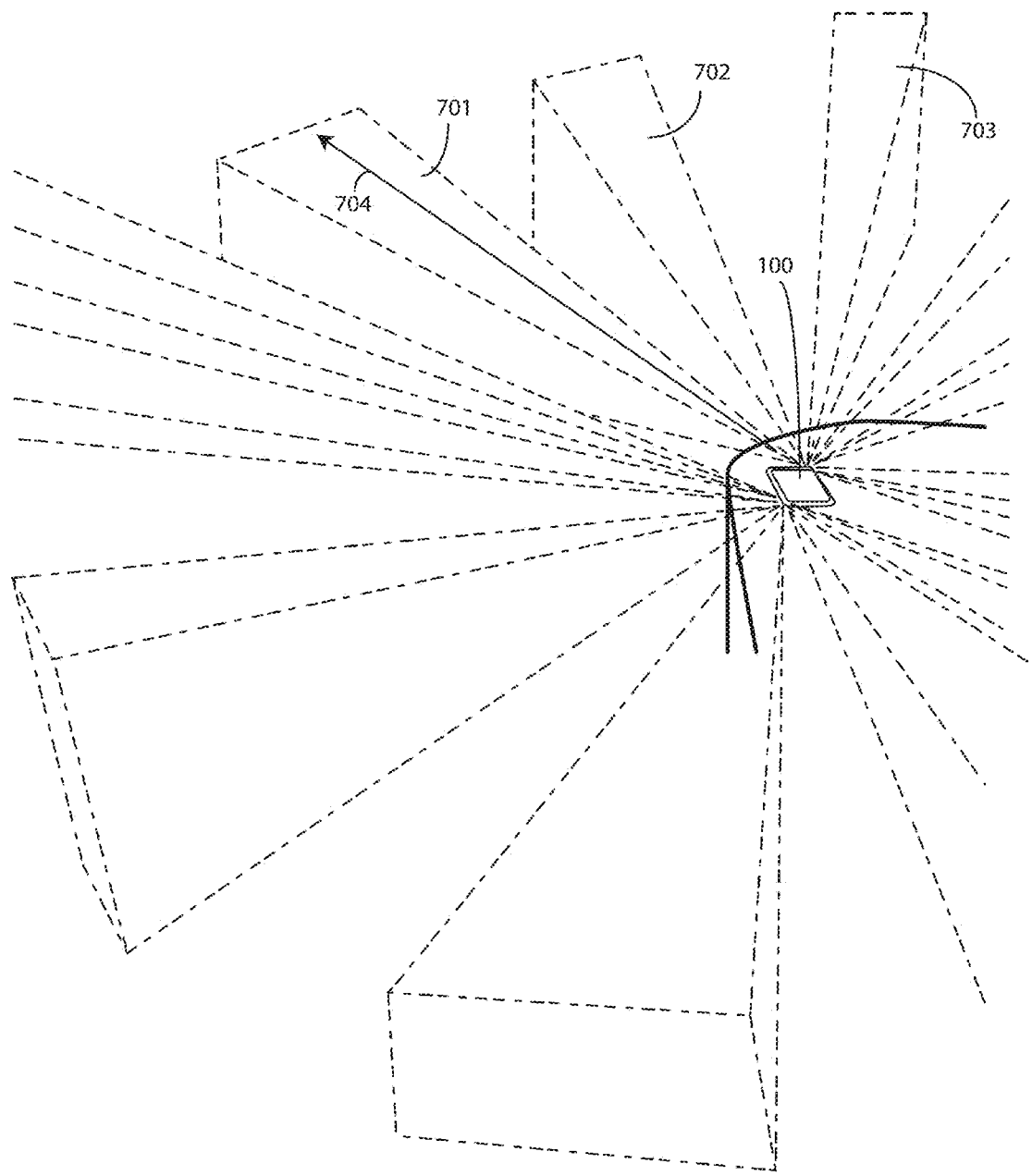
FIG. 7 illustrates an explanatory electronic device having a plurality of proximity sensor components disposed at corners of the electronic device in accordance with one or more embodiments of the disclosure.

Turning now to FIG. 7, the electronic device 100 is in the default mode of operation. Most components, including the display (102), other sensors (109), and other components (110) are in a low power or sleep mode. However, the one or more proximity sensor components (140) are in their active mode waiting to receive infrared emissions from an object external to the housing (101) of the electronic device 100.

As shown in FIG. 7, one or more signal reception beams 701,702,703 can be defined within which infrared emissions are received through an aperture or apertures disposed along minor edges of the electronic device 100. In this embodiment, the signal reception beams 701,702,703 define a 360-degree reception area about the minor edges of the electronic device 100 with a reception radius 704 of about ten feet. As no user is within the reception radius 704, power consumption within the electronic device 100 can remain extremely low.

Figure 8:
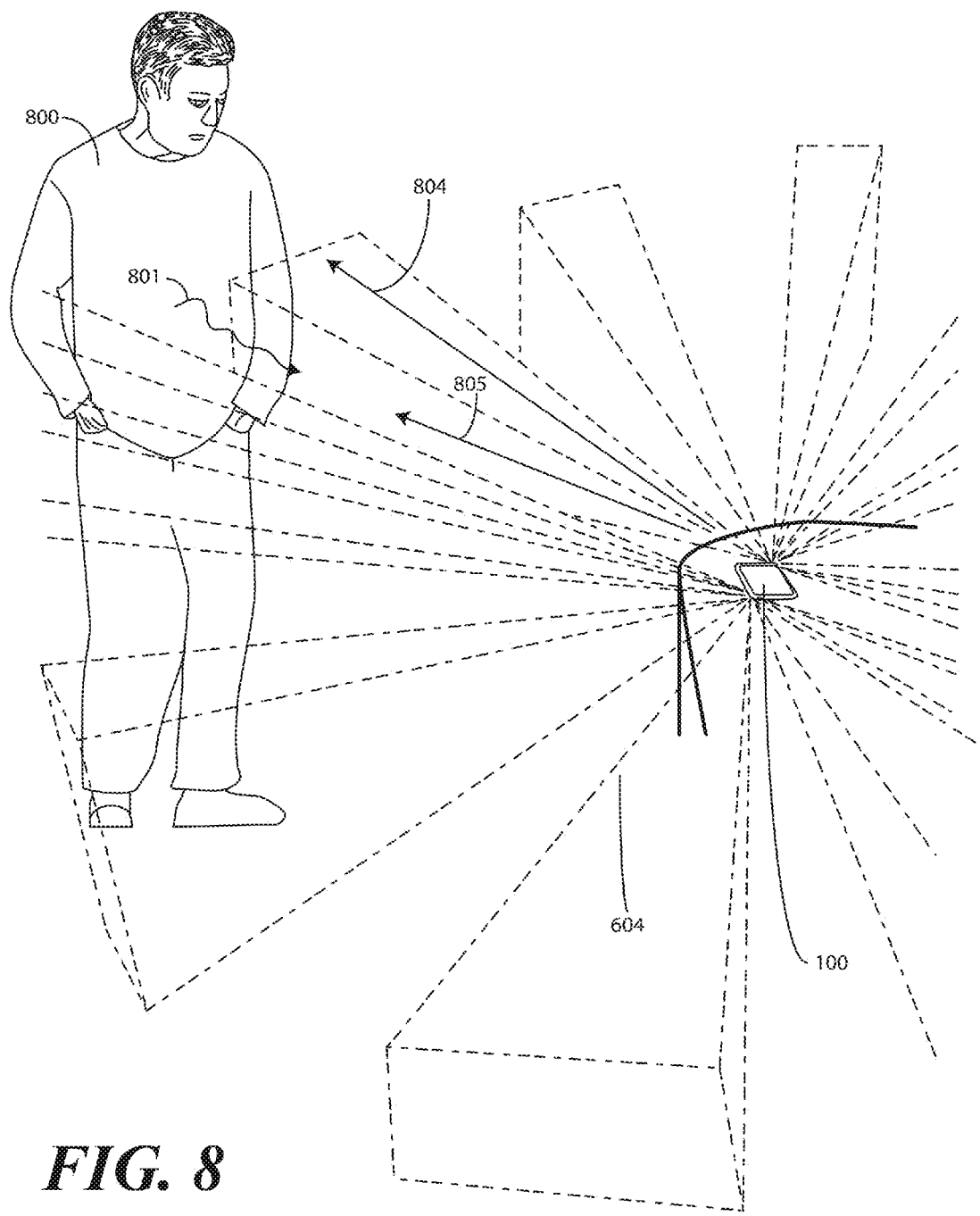
FIG. 8 illustrates an explanatory electronic device in accordance with one or more embodiments of the disclosure receiving infrared emissions through a first aperture along a first direction in accordance with one or more embodiments of the disclosure.

Turning now to FIG. 8, a user 800 enters the reception radius 704 804. The user's body heat results in an infrared emission 801 being delivered through the apertures disposed along the minor edges of the electronic device 100 to the one or more proximity sensor components (140) of the electronic device 100. When this occurs, in one embodiment the one or more processors (116) are operable to determine that the infrared emission 801 is received through side apertures due to the fact that signals generated as a function of the infrared emission 801 are in the larger dynamic range (415,515) and/or exceed a predetermined threshold (417). Accordingly, the one or more processors (116) can determine that the infrared emission 801 is received from a first direction 805 oriented substantially normally with the minor edges of the electronic device 100.

When this occurs, in one embodiment the one or more processors (116) are to execute a control operation when the infrared emission 801 is received form the first direction 805. For example, the one or more processors (116) may wake the display (102) or transition the electronic device 100 to an active mode of operation so that it is ready for use when the user 800 picks it up.

Figure 9:
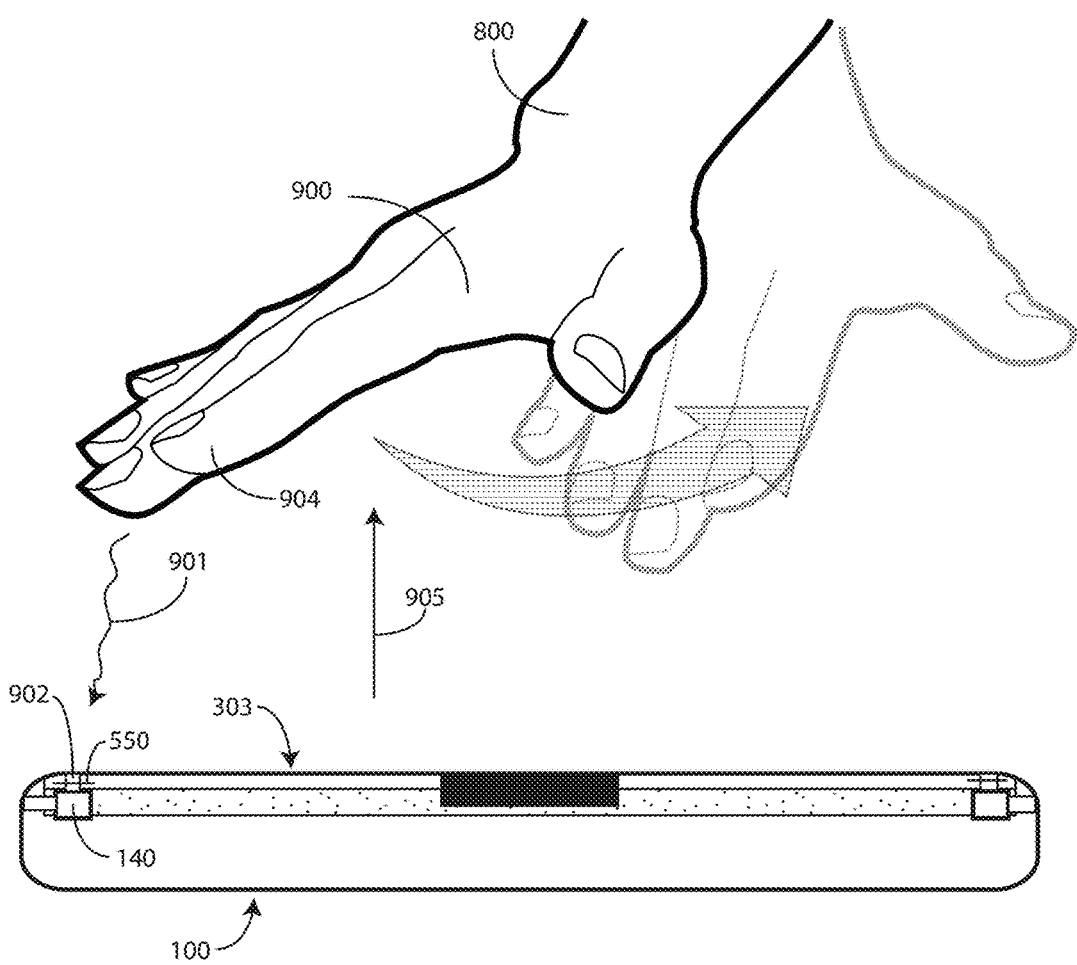
FIG. 9 illustrates an explanatory electronic device in accordance with one or more embodiments of the disclosure receiving infrared emissions through a second aperture along a second direction in accordance with one or more embodiments of the disclosure.

Turning to FIG. 9, the user 800 is waving a hand 900 above a major face 303 of the electronic device 100, which is shown in a sectional view. The user's hand 900 delivers an infrared emission 901 to the proximity sensor components 140 through an aperture 902 in the major face 303. This infrared emission 901 passes through a thermal attenuator 550 to the proximity sensor components 140. This attenuates the infrared emission 901. By detecting that the received infrared emission is attenuated, the one or more processors (116) can detect that the received infrared emission was received from a second direction 905 that is different from the first direction (805) shown in FIG. 8.

Figure 10:
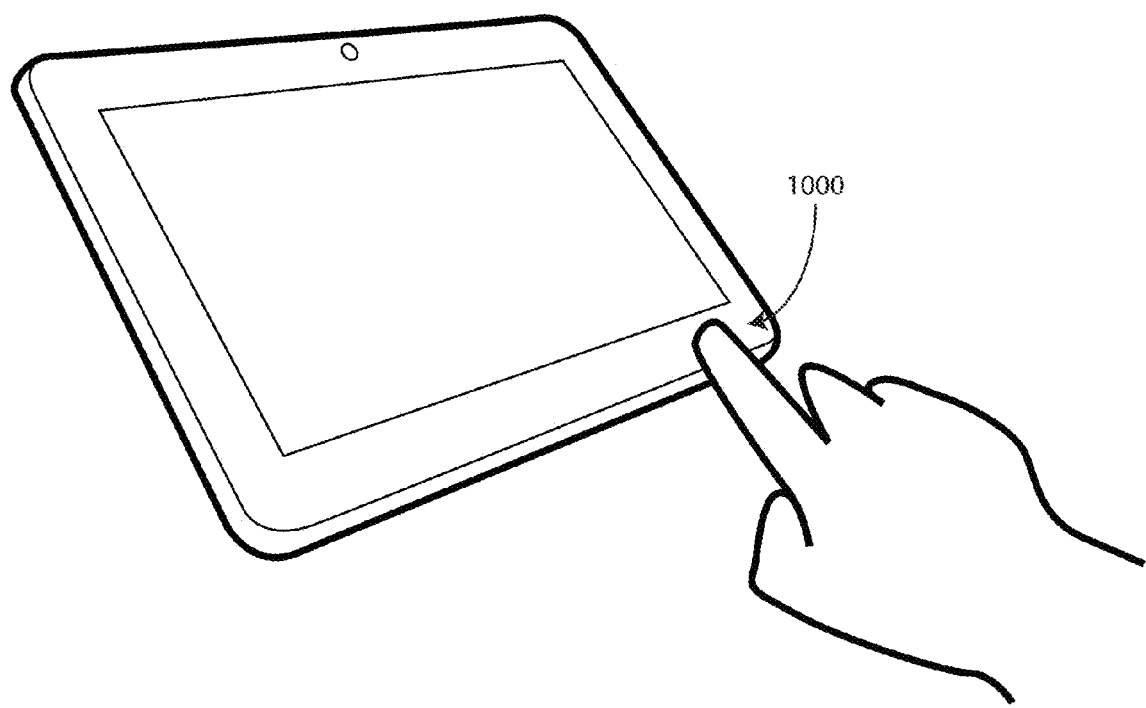
FIG. 10 illustrates an explanatory electronic device in accordance with one or more embodiments of the disclosure receiving touch input in accordance with one or more embodiments of the disclosure.

Accordingly, in one embodiment the one or more processors (116) can identify the infrared emission 901 as user input when it is received along the second direction 905. The one or more processors (116) can detect this user input by receiving the infrared emission 901 and can then execute a different control operation than that executed in FIG. 8. For example, the one or more processors (116) may launch an application, control a cursor, change a display presentation of the display 102, or otherwise control the electronic device 100. For instance, the user may be able to control volume of the telephone call by making gestures across the front major face 303, with those gestures being detected by the set of proximity sensor components 140 through the apertures 902 in the front major face 303. By placing a finger 904 above the aperture 902, the user can cause the signal delivered to the proximity sensor component 140 to saturate at the predetermined threshold (417) of the second dynamic range to deliver touch input as well. Such touch input 1000 is shown in FIG. 10.

Figure 11:
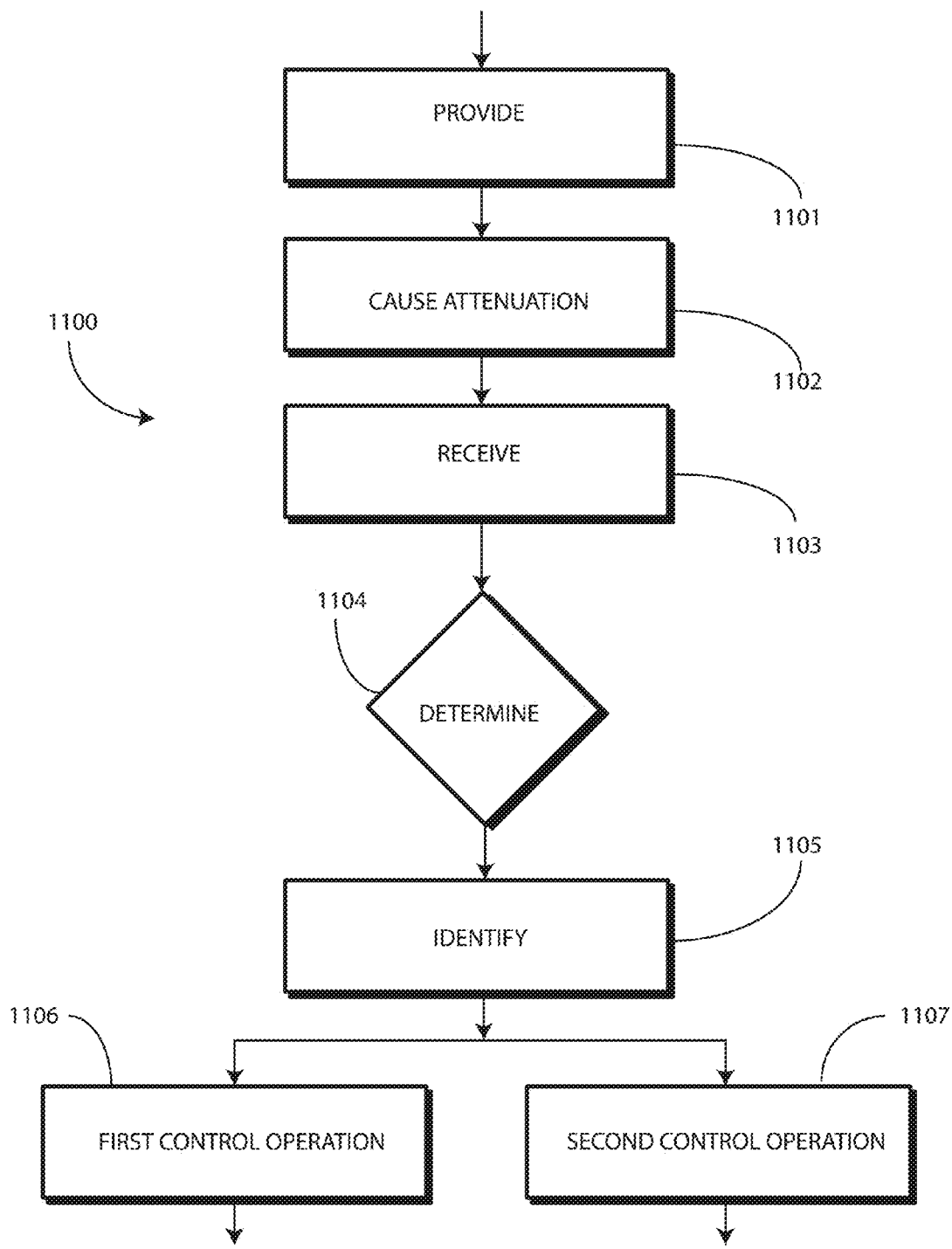
FIG. 11 illustrates one explanatory method in accordance with one or more embodiments of the disclosure.

Turning now to FIG. 11, illustrated therein is one explanatory method 1100 suitable for an electronic device configured in accordance with one or more embodiments of the disclosure.

At step 1101, the method 1100 includes providing an electronic device. In one embodiment, this step 1101 includes providing an electronic device with a housing, one or more processors, and one or more proximity sensor components operable with the one or more processors. In one embodiment, each proximity sensor component includes an infrared signal receiver to receive an infrared emission from an object external to the housing. In one embodiment, the electronic device of step 1101 disposed each proximity sensor component adjacent to at least a first aperture in the housing having a first axis oriented in a first direction and a second aperture in the housing having a second axis oriented in a second direction different from the first direction.

At step 1102, the method 1100 causes infrared emissions through one of the first aperture or the second aperture to be attenuated. This can occur in a variety of ways. For example, in one embodiment this step 1102 includes defining a first aperture area that is less than a second aperture area defined by the second aperture to attenuate the infrared emission. The first aperture can define a first aperture area that is less than a second aperture area defined by the second aperture to attenuate infrared emissions passing through the first aperture to the each proximity sensor component more than those passing through the second aperture. In another embodiment, this step 1102 includes providing a thermal attenuator between one of the first aperture or the second aperture and the at least one proximity sensor component.

At step 1103, the method 1100 includes receiving, with at least one proximity sensor component disposed adjacent to the first aperture and the second aperture, an infrared emission from an object external to the housing. At decision 1104, the method 1100 includes determining, with one or more processors operable with the at least one proximity sensor component whether the infrared emission has been attenuated. In one embodiment, this decision 1104 includes determining whether a magnitude of a signal corresponding to the infrared emission, generated by an infrared receiver of the proximity sensor component, exceeds a predetermined threshold. Alternatively, this decision 1104 can comprise determining whether the signal corresponding to the infrared emission is with a first dynamic range or a second dynamic range, with one of the first dynamic range or the second dynamic range being less than the other. At step 1105, the method 1100 identifies, with the one or more processors, whether the infrared emission was received from the first direction or the second direction as a function of whether the infrared emission has been attenuated.

In one embodiment, the method 1100 executes a control operation at steps 1106 and 1107. The control operation can change based upon whether the infrared emission was received from the first direction or the second direction. When the infrared emission has been attenuated, the control operation can be a first control operation. If the infrared emission is not attenuated, in one embodiment the method 1100 executes a second control operation, different from the first control operation. For example, when the signal is attenuated, the method 1100 may detect an object's presence within a thermal reception radius. By contrast, when the signal is not attenuated, the method 1100 can identify the received infrared emission as user input and can control the electronic device accordingly. Where the opposite convention is used, the method 1100 can detect presence when the signal is not attenuated, and can control the electronic device in response to attenuated signals.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. An electronic device, comprising:
   a housing;
   one or more processors; and
   one or more proximity sensor components operable with the one or more processors and each comprising an infrared signal receiver to receive an infrared emission from an object external to the housing; and
   a thermal attenuator to attenuate the infrared emission;
   the housing defining a first aperture and a second aperture adjacent to the one or more proximity sensor components, the first aperture having a first axis oriented in a first direction and the second aperture having a second axis oriented in a second direction;
   the thermal attenuator disposed between the first aperture and the one or more proximity sensor components;
   the one or more processors determining, with the each proximity sensor component, whether a received infrared emission is attenuated to detect whether the received infrared emission was received from the first direction or the second direction.

2. The electronic device of claim 1, the one or more processors to determine whether the received infrared emission is attenuated by determining whether a magnitude of a signal generated by the each proximity sensor component as a function of the received infrared emission exceeds a predetermined threshold.

3. The electronic device of claim 1, the one or more processors to execute a first control operation when the received infrared emission is received from the first direction.

4. The electronic device of claim 3, the one or more processors to execute a second control operation when the received infrared emission is received from the second direction.

5. The electronic device of claim 1, the first direction substantially orthogonal to the second direction.

6. The electronic device of claim 1, the thermal attenuator to attenuate the infrared emission by at least half.

7. The electronic device of claim 1, the one or more processors to determine the object is within a thermal reception radius when the received infrared emission was received through from one of the first direction or the second direction.

8. The electronic device of claim 7, the one or more processors to detect user input when the received infrared emission was received from another of the first direction or the second direction.

9. The electronic device of claim 8, the user input one of touch input or gesture input.

10. The electronic device of claim 1, the each proximity sensor component disposed at a corner of the electronic device.

11. An electronic device, comprising:
a housing;
one or more processors; and
one or more proximity sensor components operable with the one or more processors, each proximity sensor component:
comprising an infrared signal receiver to receive an infrared emission from an object external to the housing; and
disposed adjacent to at least a first aperture in the housing having a first axis oriented in a first direction and a second aperture in the housing having a second axis oriented in a second direction different from the first direction;
the first aperture defining a first aperture area less than a second aperture area defined by the second aperture to attenuate infrared emissions passing through the first aperture to the each proximity sensor component more than those passing through the second aperture;
the one or more processors determining, with the each proximity sensor component, whether a magnitude of a signal corresponding to the infrared emission exceeds a predetermined threshold to detect whether the infrared emission was received from the first direction or the second direction.

12. The electronic device of claim 11, the first aperture area less than or equal to half the second aperture area.

13. The electronic device of claim 11, the first direction oriented substantially orthogonally with a major face of the housing, the second direction oriented substantially orthogonally with a minor edge of the housing.

14. The electronic device of claim 13, the one or more processors to identify the infrared emissions received from the first direction as user input.

15. The electronic device of claim 11, one or more of the first aperture or the second aperture comprising a plurality of apertures.

16. A method in an electronic device having a housing, the method comprising:
receiving, with at least one proximity sensor component disposed adjacent to a first aperture having a first axis oriented in a first direction and a second aperture having a second axis oriented in a second direction that is different from the first direction, an infrared emission from an object external to the housing;
determining, with one or more processors operable with the at least one proximity sensor component whether the infrared emission has been attenuated; and
identifying, with the one or more processors, whether the infrared emission was received from the first direction or the second direction as a function of whether the infrared emission has been attenuated.

17. The method of claim 16, the determining whether the infrared emission has been attenuated comprising determining whether a magnitude of the infrared emission exceeds a predetermined threshold.

18. The method of claim 16, further comprising executing a first control operation when the infrared emission has been attenuated.

19. The method of claim 16, further comprising providing a thermal attenuator between one of the first aperture or the second aperture and the at least one proximity sensor component.

20. The method of claim 16, the first aperture defining a first aperture area that is less than a second aperture area defined by the second aperture to attenuate the infrared emission.

* * * * *